Nov. 26, 1957  J. T. KELLY  2,814,654
ALKYLATION PROCESS
Filed Jan. 17, 1955
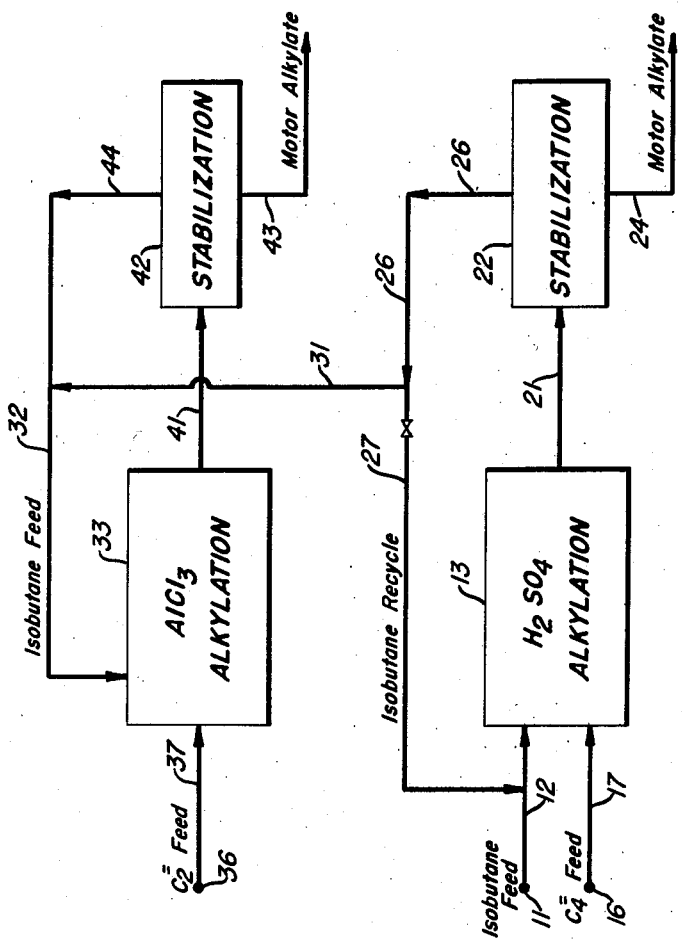
INVENTOR.
Joe T. Kelly
BY
Michael Difinecy
ATTORNEY ced Nov. 26, 1957

2,814,654

ALKYLATION PROCESS

Joe T. Kelly, Galveston, Tex., assignor to The American Oil Company

Application January 17, 1955, Serial No. 482,047

3 Claims. (Cl. 260—683.4)

This invention relates to the preparation of high octane gasoline components. More specifically it relates to an improved process for the preparation of alkylate.

In the alkylation of isobutane and ethylene using an aluminum chloride-type catalyst, the catalyst is extremely sensitive to the presence of contaminants which boil closely about the isobutane boiling point. These contaminants not only decrease the catalyst life, but have an adverse effect on activity with respect to the quality of the alkylate produced.

An object of the invention is an improved alkylation process wherein aluminum chloride catalyst ethylene-isobutane alkylation operates at maximum catalyst life and catalyst activity. Another object is a combination process wherein contaminated isobutane is purified at little or no cost for use in a subsequent ethylene-isobutane alkylation involving aluminum chloride-type catalyst. Other objects will become apparent in the course of the detailed description.

The alkylation process of this invention comprises (1) contacting (a) isobutane contaminated with at least one close boiling compound selected from the class consisting of olefins, diolefins, acetylenes, sulfur compounds and nitrogen compounds with (b) an olefin containing from 3 to 6 carbon atoms in the presence of an acidic alkylation catalyst selected from the class consisting of sulfuric acid and hydrofluoric acid, under alkylation conditions, (2) separating isobutane, now essentially free of contaminants, from the alkylation product, (3) contacting ethylene with purified isobutane from step (2) in the presence of an $AlCl_3$ catalyst under alkylation conditions to obtain an alkylation product comprising diisopropyl.

The annexed figure, which forms a part of this specification, shows in block diagram form the combination process of the invention. Since each alkylation step in the process is conventional and well known in the art, it is not considered necessary to show in detail the individual steps taking place in each of the alkylation operations.

In the first alkylation operation of the combination process, contaminated isobutane feed and olefins containing from 3 to 6 carbon atoms are reacted in the presence of a liquid acidic alkylation catalyst. In the figure, contaminated isobutane feed from source 11 is passed by way of line 12 into alkylation zone 13, which is shown as a single block. The isobutane charged to zone 13 is contaminated with compounds close boiling to the isobutane boiling point, which compounds are selected from the class consisting of olefins, diolefins, acetylenes, sulfur compounds and nitrogen compounds. Isobutane boils at 11° F. Examples of the possible contaminants and their boiling points are: Butene–1, 20° F.; butene–2, 34° F.; methylpropene, 20° F.; butadiene–1,3, 24° F.; propyne, −9° F.; butyne–1, 47° F.; sulfur dioxide, 14° F.; methyl mercaptan, 43° F.; and methyl amine, 19° F. All of these contaminants react with aluminum chloride to reduce or even destroy the catalytic effectiveness in the alkylation of ethylene and isobutane.

Olefins containing from 3 to 6 carbon atoms from source 16 are passed by way of line 17 into zone 13. Examples of these olefins are propylene, butene-1, butene-2, pentene-1, and hexene-2. In this embodiment, the feed consists of a mixture of refinery butane-butylenes, that is, the feed consists of the natural mixture of 4 carbon atom-containing aliphatics produced in refinery operations. Also, this stream may contain a small amount of propane and propylene as well as some pentanes and pentenes. Thus the feed contains a mixture of butylenes, n-butane and isobutane as well as the $C_3$ and $C_5$ aliphatics.

The alkylation is carried out in the presence of a liquid acidic alkylation catalyst selected from the class consisting of sulfuric acid and hydrofluoric acid. Specifically the sulfuric acid has a concentration of at least about 85% by weight and usually between about 85% and 95%. The hydrofluoric acid contains at least about 90% of HF and preferably is substantially anhydrous.

The alkylation reaction is carried out under well known alkylation conditions for this type of alkylation. A particularly good summary of liquid acid catalyzed alkylation is set out in "Progress in petroleum technology—commercial alkylation of isobutane" by A. V. Mrstik et al., pages 97–108 (Advances in Chemistry Series No. 5, American Chemical Society). Thus, for example, the external ratio of isobutane to olefin may be between about 3 and about 25 and more usually between about 5 and 10. The sulfuric acid, which herein is 90% strength, may be present in about a ratio of 1 to 5 parts of acid per part of total hydrocarbon feed, more usually about 1.5 parts of acid per part of feed. The reaction may be carried out between about 20° F. and about 60° F., more usually about 40° F. The acid and the feed are intimately agitated in the reactor until the alkylation is essentially complete. The materials are then passed to a separator where the acid is separated from the alkylation product and unreacted hydrocarbons. The total hydrocarbons are washed with aqueous caustic to remove acid and are then passed by way of line 21 to stabilization zone 22.

In stabilization zone 22, which is shown by block diagram, the alkylate product and unreacted hydrocarbons are separated by fractionation. An alkylate product boiling in the motor gasoline range is shown as being withdrawn by line 24. A butane fraction consisting essentially of isobutane is shown as being withdrawn from zone 22 by way of line 26. A portion of this isobutane stream may be recycled to the alkylation zone 13 by way of valved line 27. This isobutane stream is free of contaminants, i. e., is a purified isobutane. Under the alkylation condition of zone 13, the liquid acid removes the contaminating olefins, diolefins, acetylenes, sulfur compounds and nitrogen compounds.

Isobutane from line 26 is passed by way of lines 31 and 32 into a second alkylation zone 33. Ethylene or a mixture of ethylene and propylene predominating in ethylene from source 36 is passed by way of line 37 into zone 33.

Alkylation zone 33 is shown herein by block diagram and represents a conventional alkylation operation wherein the catalyst is aluminum chloride or aluminum chloride promoted with HCl or an aluminum chloride-hydrocarbon complex promoted with HCl. It is to be understood that the alkylation operation carried on in zone 33 is conventional and is well known in the art. For example, Alden et al., Oil and Gas Journal, February 9, 1946, page 71 et seq. Also, a process is described in U. S. 2,410,498 and U. S. 2,429,718.

In this embodiment, the catalyst consists of a complex formed by the reaction of aluminum chloride and iso-octane and HCl is added to promote the catalyst activity. The mole ratio of isobutane to ethylene or ethylene-propylene is between about 4 to 1 and 25 to 1; more usually between about 5 and 8 to 1. The alkylation is carried out at a temperature between about 70° F. and 150° F., and preferably about 130° F.

It is to be understood that the term "alkylation conditions" as carried on in zones 13 and 33 is intended to include any variations which are known to this art. For example, in zone 33, two stages may be used operating at different temperatures in order to improve the yield of alkylate.

The alkylation product and unreacted hydrocarbons are passed from zone 33, after having been freed of occluded catalyst by caustic washing or other techniques known to the art. These materials are passed by way of line 41 into stabilization zone 42. In stabilization zone 42 the materials are fractionated and an alkylate fraction boiling in the motor gasoline range, i. e., between about 100° F. and 400° F. is shown as being withdrawn by way of line 43. Unreacted isobutane is separated by fractionation and is recycled by way of lines 44 and 32 to alkylation zone 33.

The motor alkylates produced in the two zones are of different octane numbers and value and usually will be stored separately and used for different purposes. For example, the alkylate from stabilization zone 42 is particularly suitable for aviation gasoline because of its very high content of diisopropyl. By fractionation it is possible to obtain a stream which is essentially diisopropyl. Of, if desired, the two alkylates may be combined and used as blending agents for improving the octane number of motor gasoline derived from other refinery processes.

By the use of the purified isobutane feed obtained from stabilization zone 22 by way of lines 26, 31, and 32, the catalyst life in zone 33 is greatly prolonged and the quality of the alkylate produced is improved. This improvement consists mainly of an increased yield of diisopropyl and a decreased yield of reaction products other than diisopropyl, such as $C_8$ and $C_{10}$ paraffins, and other isomers of hexane, which isomers are not of as good octane quality as diisopropyl.

Thus having described the invention, what is claimed is:

1. An alkylation process comprising (1) contacting (a) isobutane contaminated with at least one close boiling compound selected from the class consisting of olefins, diolefins, acetylenes, sulfur compounds and nitrogen compounds with (b) an olefin containing from 3 to 6 carbon atoms in the presence of an acidic alkylation catalyst selected from the class consisting of sulfuric acid and hydrofluoric acid, under alkylation conditions, (2) separating purified isobutane, now essentially free of contaminants, from the alkylation product, (3) contacting ethylene with said purified isobutane only in the presence of an $AlCl_3$ catalyst under alkylation conditions to obtain an alkylation product comprising diisopropyl.

2. The process of claim 1 wherein said acidic catalyst is sulfuric acid of a concentration of at least about 85%.

3. The process of claim 1 wherein said $AlCl_3$ catalyst consists of an $AlCl_3$-hydrocarbon complex.

References Cited in the file of this patent

UNITED STATES PATENTS

| | | |
|---|---|---|
| 2,312,539 | Frey | Mar. 2, 1943 |
| 2,319,209 | Carmody | May 18, 1943 |
| 2,410,498 | Hepp | Nov. 5, 1946 |